United States Patent Office 2,825,725
Patented Mar. 4, 1958

2,825,725

MONOAZO DYESTUFFS

Edgar Enders, Leverkusen-Bayerwerk, Germany, assignor to Farbenfabriken Bayer Aktiengesellschaft, Leverkusen, Germany, a corporation of Germany No Drawing. Application December 15, 1955
Serial No. 553,207

Claims priority, application Germany December 30, 1954

8 Claims. (Cl. 260—146)

The present invention relates to metal containing monoazo dyestuffs and to a process for their manufacture; more particularly it relates to monoazo dyestuffs corresponding to the following general formula:

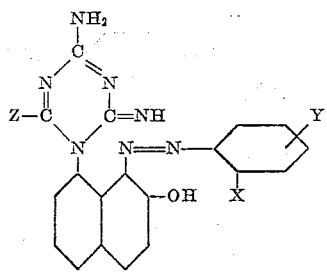

wherein X stands for a hydroxy, alkoxy or carboxyl group, Y for hydrogen or a non-ionic radical, and Z means hydrogen, a lower alkyl radical which may be substituted, e. g., hydroxy lower alkyl, or a hydroxy group, and the chromium and cobalt complexes of said azo dyestuffs.

It is an object of the present invention to provide new metal containing monoazo dyestuffs and a process for their manufacture. It is a further object to provide new metal containing monoazo dyestuffs of very good fastness properties.

The monoazo dyestuffs to be metallized can be obtained by coupling diazotized amines of the benzene series containing a metallizable group in o-position to the diazonium group and which may bear non-ionic radicals in the benzene nucleus, with a 7-hydroxynaphthyl-1-triazine derivative of the general formula

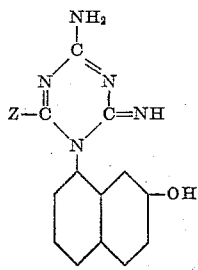

wherein Z has the above significance. Coupling components of this general formula may be obtained by reacting acylating agents with 7-hydroxy-1-naphthylbiguanidine or its salts such as described in German patent specification No. 864,951. As acylating agents there may be mentioned for example formic acid, formamide, acetic acid anhydride, propionic acid, methoxyacetic acid, phosgene, chloroformic acid ester or urea. Dependent on the ability of the acylating agent to react, the conversion with the 7-hydroxy-1-naphthylbiguanidine may be carried out without a diluting agent at an elevated temperature or in an aqueous alkaline solution.

o-Substituted amines of the benzene series suitable as diazo components for the manufacture of the above defined dyestuffs are, for example, 1-amino-2-hydroxybenzene, 1-amino-2-hydroxy-5-chlorobenzene, 1-amino-2 - hydroxy - 5 - nitrobenzene, 1 - amino - 2 - hydroxy-4 - nitrobenzene, 1 - amino - 2,5 - dimethoxybenzene, 1 - aminobenzene - 2 - carboxylic acid, 1 - amino - 4- or 5 - chlorobenzene - 2 - carboxylic acid, 1 - amino - 2-hydroxybenzene - 5 - sulfonic acid amide, 1 - amino-2 - hydroxybenzene - 5 - sulfonic acid methyl - amide, 1-amino-2-hydroxybenzene-5-sulfonic acid methyl-amide, 1 - amino - 2 - hydroxybenzene - 5 - sulfonic acid dimethyl - amide, 1 - amino - 2 - hydroxybenzene - 5-methylsulfone, 1 - amino - 2 - hydroxybenzene - 5 - chloromethylsulfone, 1 - amino - 2 - hydroxybenzene - 5-ethylsulfone, the corresponding 1 - amino - 2 - hydroxybenzene-4-sulfonic acid amides and 1-amino-2-hydroxybenzene - 4 - alkylsulfones, 1-amino - 2 - hydroxy - 3-nitrobenzene-5-sulfonic acid amide, 1-amino-2-hydroxy-5 - methylbenzene, 1 - amino - 2 - hydroxy - 3 - acetylamino - 5 - methylbenzene, 1 - amino - 2 - hydroxy - 3-acetylamino-5-chlorobenzene.

The conversion of the aforesaid metallizable monoazo dyestuffs into cobalt or chromium complexes can be effected in usual manner, for example by reacting with ammoniacal solutions of cobaltic salts, or with oxalic acid or salicylic acid complexes of trivalent chromium, or with alkali metal chromates in the presence of reducing agents, or with chromium or cobalt salts in organic solvents.

The chromium- or cobalt-containing dyestuffs obtainable according to the present invention are suitable for dyeing animal materials such as wool, silk, leather, as well as polyamide and polyurethane fibres. They are particularly suitable for dyeing wool from neutral or weakly acid baths, from which they yield level brown, olive or grey shades having very good light- and wet-fastness.

The following examples are given for the purpose of illustrating the invention, the parts by weight and the parts by volume being in the ratio of grams to milliliters.

*Example 1*

18.8 parts by weight of 1-amino-2-hydroxybenzene-5-sulfonic acid amide are dissolved in 250 parts by volume of water and 18 parts by volume of concentrated hydrochloric acid, and treated dropwise with a solution of 7.0 parts by weight of sodium nitrite in 25 parts by volume of water at 0–5° C. A few drops of a saturated aqueous solution of amidosulfonic acid are added after an hour. The diazo solution thus obtained is slowly run into a solution of 26 parts by weight of 2-amino-4-imino - 7' - hydroxy - 1',5 - naphthyl - triazine - (1,3,5) and 25 parts by weight of soda in 500 parts by volume of water, 500 parts by weight of ice and 20 parts by volume of a 40 percent caustic soda solution. When the coupling is completed the mixture is heated to 60–70° C., the dyestuff corresponding to the formula

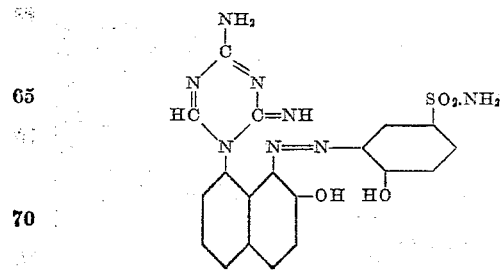

is completely separated out by addition of common salt and filtered off.

The dyestuff paste is dissolved in 800 parts by volume of hot water and, after addition of 300 parts by volume of a chromium salicylic acid solution containing 4.0 parts by weight of chromium oxide, it is heated under reflux until the chroming is complete. The metal-containing dyestuff is completely separated out by addition of common salt, filtered off and dried. A black powder is obtained which dissolves in water with a bluish gray color and dyes wool from a neutral bath in level bluish gray shades of very good fastness to light and washing.

If instead of the diazo component mentioned above there are used corresponding amounts of 1-amino-2-hydroxybenzene-5-sulfonic acid methylamide, 1-amino-2-hydroxybenzene-5-sulfonic acid dimethylamide, 1-amino-2-hydroxybenzene-5-methylsulfone or 1-amino-2-hydroxybenzene-5-ethylsulfone, dyestuffs are obtained having similar properties.

If instead of the above said coupling compound there are used corresponding amounts of 2-amino-4-imino-7'-hydroxy-1',5-naphthyl-6-methyl- or -6-hydroxy-triazine-(1,3,5), dyestuffs are obtained having similar properties.

Example 2

The dyestuff paste obtained according to the first paragraph of Example 1, is dissolved in 800 parts by volume of hot water and treated dropwise with 300 parts by volume of an ammoniacal solution of 15 parts by weight of crystalline cobalt sulfate at 90–95° C. The metallization is terminated after a short time. The cobalt containing dyestuff is completely separated out by addition of common salt, filtered off and dried. A dark powder is obtained which dyes wool from a neutral bath in level reddish gray shades very fast to light and washing.

Example 3

15.4 parts by weight of 1-amino-2-hydroxy-5-nitrobenzene in 250 parts by volume of water and 18 parts by volume of concentrated hydrochloric acid are diazotized with 7 parts by weight of sodium nitrite in 25 parts by volume of water. The diazo solution thus obtained is slowly run into a solution of 26 parts by weight of 2-amino-4-imino-7'-hydroxy - 1',5 - naphthyltriazine-(1,3,5) and 25 parts by weight of soda in 500 parts by volume of water, 500 parts by weight of ice and 20 parts by volume of a 40 percent caustic soda solution. After the coupling is completed, the mixture is heated to 60–70° C. and the dyestuff, corresponding to the formula

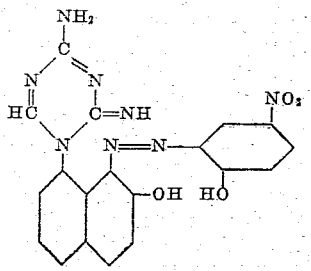

is filtered off.

The dyestuff paste is stirred in 2000 parts by volume of hot water and, after an addition of 300 parts by volume of a chromium salicylic acid solution, containing 4.0 parts by weight of chromium oxide, it is heated under reflux until the metallization is complete. The dyestuff is completely separated out by addition of common salt, filtered off and dried. A grayish green powder is obtained which dissolves in water with an olive color and dyes wool from a neutral bath in level olive shades very fast to light and washing.

If instead of the aforesaid diazo components the corresponding quantity of 1-amino-2-hydroxy-4-nitrobenzene is used, a dyestuff is obtained which dyes wool in fast olive-green shades.

Example 4

21.6 parts by weight of 1-amino-2-hydroxybenzene-4-sulfonic acid dimethylamide in 400 parts by volume of water and 18 parts by volume of concentrated hydrochloric acid are diazotized with 7.0 parts by weight of sodium nitrite in 25 parts by volume of water; the diazo solution thus obtained is run into a solution of 26 parts by weight of 2-amino-4-imino-7'-hydroxy - 1',5 - naphthyltriazine-(1,3,5) and 25 parts by weight of soda in 500 parts by volume of water, 500 parts by weight of ice and 20 parts by volume of a 40 percent caustic soda solution. When the coupling is completed, the mixture is heated to 60–70° C., and the dyestuff corresponding to the formula

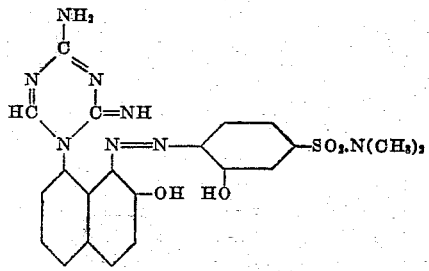

is filtered off.

The dyestuff paste thus obtained is dissolved in 1500 parts by volume of hot water. 250 parts by volume of an alkaline solution of 15 parts by weight of sodium bichromate and 14 parts by weight of glucose are added dropwise to the solution at 95–100° C. The mixture is then heated under reflux for another hour, 250 parts by volume of a saturated common salt solution are run into it, the chromium containing dyestuff is filtered off and dried.

A dark powder is obtained which dyes wool from a neutral bath in level greenish gray shades having very good fastness to light and water.

The cobalt complex of the same dyestuff dyes wool from a neutral bath in fast bluish gray shades.

Example 5

13.7 parts by weight of 1-aminobenzene-2-carboxylic acid in 250 parts by volume of water and 18 parts by volume of concentrated hydrochloric acid are diazotized with 7.0 parts by weight of sodium nitrite in 25 parts by volume of water; the diazo solution thus obtained is run into a solution of 26 parts by weight of 2-amino-4-imino-7'-hydroxy-1',5-naphthyltriazine - (1,3,5) and 25 parts by weight of soda in 500 parts by volume of water, 500 parts by weight of ice and 20 parts by volume of a 40 percent caustic soda solution. After the coupling is completed, the mixture is heated to 60–70° C. and the dyestuff of the following formula

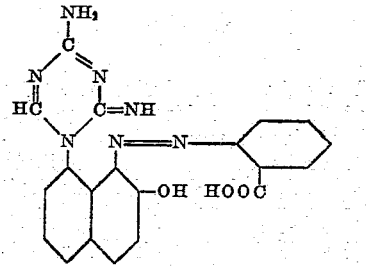

is completely separated out by addition of common salt and filtered off.

The dyestuff paste thus obtained is added to 300 parts by volume of dimethylformamide; a concentrated aqueous chromium formate solution, containing 4.5 parts by weight of chromium oxide, is added and the mixture is stirred at 125° C. for several hours. After cooling, the mixture is run into 1000 parts by volume of a saturated common salt solution, the separated chromium-containing dyestuff is filtered off, washed with common salt solution, mixed with 5 parts by weight of trisodiumphosphate and dried.

A dark brown powder is obtained which dissolves in water with a brown color and dyes wool from a neutral bath in very level, reddish dark-brown shades having very good fastness to light and washing.

*Example 6*

15.3 parts by weight of 1-amino-2,5-dimethoxybenzene are dissolved in 400 parts by volume of water and 18 parts by volume of concentrated hydrochloric acid and diazotized with 7.0 parts by weight of sodium nitrite in 25 parts by volume of water. The diazo solution thus obtained is run into a solution of 26 parts by weight of 2-amino - 4 - imino - 7' - hydroxy - 1',5 - naphthyl - triazine-(1,3,5) and 25 parts by weight of soda in 500 parts by volume of water, 500 parts by weight of ice and 20 parts by volume of a 40 percent caustic soda solution. After the coupling is completed, the mixture is heated to 60–70° C., and the dyestuff of the following formula

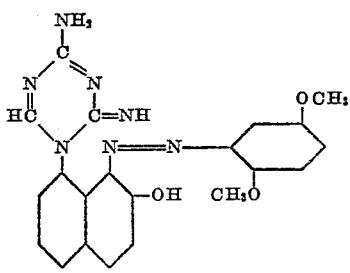

is filtered off and dried.

The dyestuff powder thus obtained is introduced into 300 parts by volume of dimethylformamide; a concentrated aqueous chromium formate solution, containing 4.5 parts by weight of chromium oxide, is added to it and the mixture is stirred at 130–135° C. for several hours until the metallization is completed. The mixture is run into 1000 parts by volume of a saturated common salt solution, the separated chromium containing dyestuff is filtered off, stirred with dilute caustic soda solution, again filtered off and dried.

A dark powder is obtained which dyes wool from a neutral bath in level grayish green shades having very good fastness to light and washing.

I claim:

1. Dyestuffs selected from the group consisting of monoazo dyestuffs corresponding to the general formula:

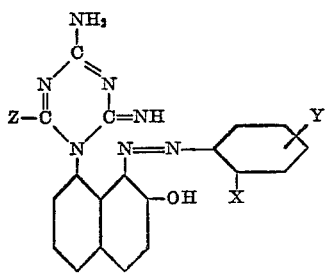

wherein X stands for a member selected from the group consisting of a hydroxy, lower alkoxy and a carboxyl group, Y means a radical selected from the group consisting of hydrogen and a non-ionic radical and Z stands for a member selected from the group consisting of hydrogen, lower alkyl, hydroxy lower alkyl and a hydroxy group, the chromium complexes thereof, and the cobalt complexes thereof.

2. A chromium complex of a dyestuff of claim 1.
3. A cobalt complex of a dyestuff of claim 1.
4. A dyestuff selected from the group consisting of the monoazo dyestuff corresponding to the following formula:

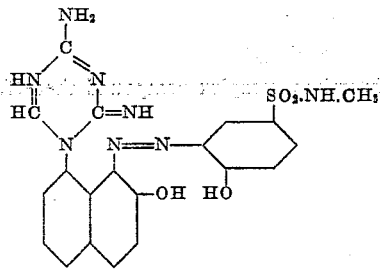

and the chromium complex thereof.

5. A dyestuff selected from the group consisting of the monoazo dyestuff corresponding to the following formula:

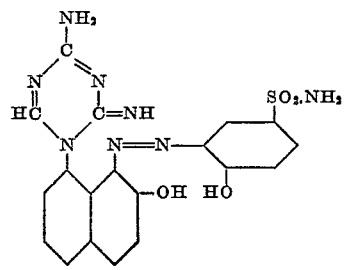

and the chromium complex compound thereof.

6. A dyestuff selected from the group consisting of the monoazo dyestuff corresponding to the following formula:

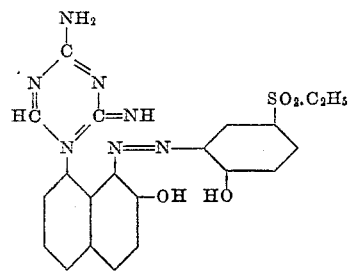

and the chromium complex compound thereof.

7. A dyestuff selected from the group consisting of the monoazo dyestuff corresponding to the following formula:

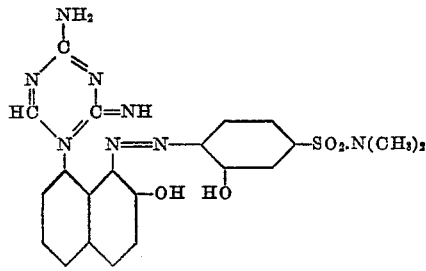

and the chromium complex compound thereof.

8. A dyestuff selected from the group consisting of the monoazo dyestuff corresponding to the following formula:
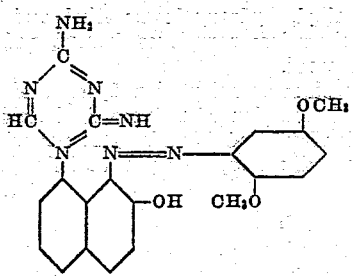
and the chromium complex compound thereof.
References Cited in the file of this patent
UNITED STATES PATENTS
2,683,707 Brassel _____ July 13, 1954
FOREIGN PATENTS
864,951 Germany _____ Jan. 29, 1953